US012662138B2

(12) United States Patent
Dane et al.

(10) Patent No.: US 12,662,138 B2
(45) Date of Patent: Jun. 23, 2026

(54) DIGITAL TWIN FOR AN ELECTRONIC CONTROL MODULE

(71) Applicant: Cummins Inc., Columbus, IN (US)

(72) Inventors: Marten H. Dane, Columbus, IN (US); Todd A. Sheridan, Fortville, IN (US)

(73) Assignee: Cummins Inc., Columbus, IN (US)

( * ) Notice: Subject to any disclaimer, the term of this patent is extended or adjusted under 35 U.S.C. 154(b) by 225 days.

(21) Appl. No.: 17/628,824

(22) PCT Filed: Jul. 21, 2020

(86) PCT No.: PCT/US2020/042898
§ 371 (c)(1),
(2) Date: Jan. 20, 2022

(87) PCT Pub. No.: WO2021/016250
PCT Pub. Date: Jan. 28, 2021

(65) Prior Publication Data
US 2022/0258751 A1      Aug. 18, 2022

Related U.S. Application Data

(60) Provisional application No. 62/877,089, filed on Jul. 22, 2019.

(51) Int. Cl.
*B60W 50/02*          (2012.01)
*B60W 10/06*          (2006.01)
(Continued)

(52) U.S. Cl.
CPC ........ *B60W 50/0205* (2013.01); *B60W 10/06* (2013.01); *B60W 10/10* (2013.01);
(Continued)

(58) Field of Classification Search
CPC .. B60W 50/0205; B60W 10/06; B60W 10/10; B60W 2556/45; G07C 5/008;
(Continued)

(56) References Cited

U.S. PATENT DOCUMENTS 9,158,291 B1    10/2015  Gahinet
9,881,430 B1    1/2018   Shah et al.
(Continued)

FOREIGN PATENT DOCUMENTS

WO      WO-2017/192998        11/2017

OTHER PUBLICATIONS

Alam et al. "C2PS: A Digital Twin Architecture Reference Model for the Cloud-Based Cyber-Physical Systems", IEEE Access, Jan. 23, 2017, 13 pages.
(Continued)

*Primary Examiner* — Kenneth M Dunne
*Assistant Examiner* — Micah Chuen-Him Cheng
(74) *Attorney, Agent, or Firm* — Foley & Lardner LLP

(57)          ABSTRACT

Systems and apparatuses include a vehicle system actuator, a sensor array associated with the vehicle system actuator, a vehicle controller, and a remote processing circuit. The vehicle controller is structured to receive sensor information from the sensor array, determine local control parameters based on the sensor information using a control scheme, provide local actuation information to actuators based on the local control parameters, and transmit the sensor information via a telematics device. The remote processing circuit is structured to receive the sensor information from the telematics device, determine remote control parameters based on the sensor information using the control scheme, and perform diagnostics using the remote control parameters.

18 Claims, 4 Drawing Sheets

(51) Int. Cl.

| | |
|---|---|
| *B60W 10/10* | (2012.01) |
| *G07C 5/00* | (2006.01) |
| *G07C 5/08* | (2006.01) |
| *H04W 4/44* | (2018.01) |
| *H04W 4/48* | (2018.01) |

(52) U.S. Cl.
CPC .......... *G07C 5/008* (2013.01); *G07C 5/0808* (2013.01); *H04W 4/44* (2018.02); *H04W 4/48* (2018.02); *B60W 2556/45* (2020.02)

(58) Field of Classification Search
CPC ........ G07C 5/0808; H04W 4/44; H04W 4/48; H04Q 9/00
See application file for complete search history.

(56) References Cited

U.S. PATENT DOCUMENTS

| | | | |
|---|---|---|---|
| 2006/0181406 | A1 | 8/2006 | Petite et al. |
| 2013/0332024 | A1 | 12/2013 | Garrett et al. |
| 2016/0188675 | A1 | 6/2016 | Vossler |
| 2016/0247129 | A1 | 8/2016 | Song et al. |
| 2017/0286572 | A1 | 10/2017 | Hershey et al. |
| 2018/0257683 | A1 | 9/2018 | Govindappa et al. |
| 2019/0173109 | A1 | 6/2019 | Wang |
| 2020/0177885 | A1* | 6/2020 | Brugman ............... H04N 19/31 |

OTHER PUBLICATIONS

CN First Office Action for Application No. 2020800534002, dated Mar. 31, 2023, 20 pages, with English Translation.
Extended European Search Report on EP App. No. 20845112.0, dated Apr. 14, 2023, 19 pages.
Alam et al. "C2PS: A digital twin architecture reference model for the cloud-based cyber-physical systems.", IEEE Access, Jan. 2017 https://www.researchgate.neVprofile/Kazi_Masudul_Alam/publication/ 3126464 75 _ C2PS_A_Digital_Twin_Arohitecture_Reference_ Model_for_the_Cloud-based_Cyber-Physical_Systems/links/ 58be5b3545851591 c5e9c64a/C2PS-A-Digital-Twin-Architecture-Reference-Model-for-the-Cloud-based-Cyber-Physical-Systems. pdf, 13 pages.
International Search Report and Written Opinion on International Application No. PCT/US2020/042898, mail date Nov. 6, 2020, 13 pages.
Madni et al. "Leveraging digital twin technology in model-based systems engineering." MDPI, Jan. 2019, https://www.mdpi.com/ 2079-8954/7/1/7/pdf, 13 pages.
Decision on Rejection in CN Application No. 2020800534002, dated Jan. 30, 2024, 17 pgs. (with translation).

* cited by examiner

110

130 Package vehicle information

134 Communicate packaged information to remote system

138 Unpack vehicle information

142 Process vehicle information using digital twin

146 Determine remote outputs

150 Conduct diagnostics

114 Receive Sensor Information

118 Process sensor information using control logic

122 Determine outputs

126 Control actuators according to outputs

DIGITAL TWIN FOR AN ELECTRONIC CONTROL MODULE

CROSS-REFERENCE TO RELATED APPLICATIONS

This application is a U.S. national stage filing of PCT/US2020/042898, filed Jul. 21, 2020, which claims the benefit of U.S. Provisional Patent Application No. 62/877,089, filed on Jul. 22, 2019, both of which are incorporated herein by reference in their entireties.

BACKGROUND

The present disclosure relates to a control system for a vehicle. More particularly, the present disclosure relates to systems and methods for utilizing a remote digital twin for monitoring to perform diagnostics, prognostics, and/or controls for a controller and, particularly, a vehicle controller.

SUMMARY

One embodiment relates to a system that includes a vehicle system actuator, a sensor array associated with the vehicle system actuator, a vehicle controller, and a remote processing circuit. The vehicle controller comprises one or more memory devices coupled to one or more processors, the one or more memory devices configured to store instructions thereon that, when executed by the one or more processors, cause the one or more processors to: receive sensor information from the sensor array, determine local control parameters based on the sensor information using a control scheme, provide local actuation information to actuators based on the local control parameters, and transmit the sensor information via a telematics device. The remote processing circuit is located remotely from the vehicle and comprises one or more memory devices coupled to one or more processors, the one or more memory devices configured to store instructions thereon that, when executed by the one or more processors, cause the one or more processors to: receive the sensor information from the telematics device, determine remote control parameters based on the sensor information using the control scheme, and perform diagnostics using the remote control parameters.

Another embodiment relates to processing circuit that includes one or more memory devices coupled to one or more processors, the one or more memory devices are configured to store instructions thereon that, when executed by the one or more processors, cause the one or more processors to: receive sensor information from a sensor array mounted in a vehicle, determine local control parameters based on the sensor information using a control scheme, transmit the sensor information via a telematics device to a digital twin processing circuit located remote from the vehicle, receive remote control parameters determined by the digital twin processing circuit using the control scheme via the telematics device, and update the local control parameters using the remote control parameters.

Another embodiment relates to a processing circuit that is located remotely from a vehicle and that includes one or more memory devices coupled to one or more processors, the one or more memory devices configured to store instructions thereon that, when executed by the one or more processors, cause the one or more processors to: receive sensor information from a telematics device of a vehicle controller, determine remote control parameters based on the sensor information to replicate local control parameters of the vehicle controller, and analyze the remote control parameters to provide at least one of diagnostics, predictive maintenance, or recreating a fault condition of the vehicle controller with the remote processing circuit.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Figure 1:
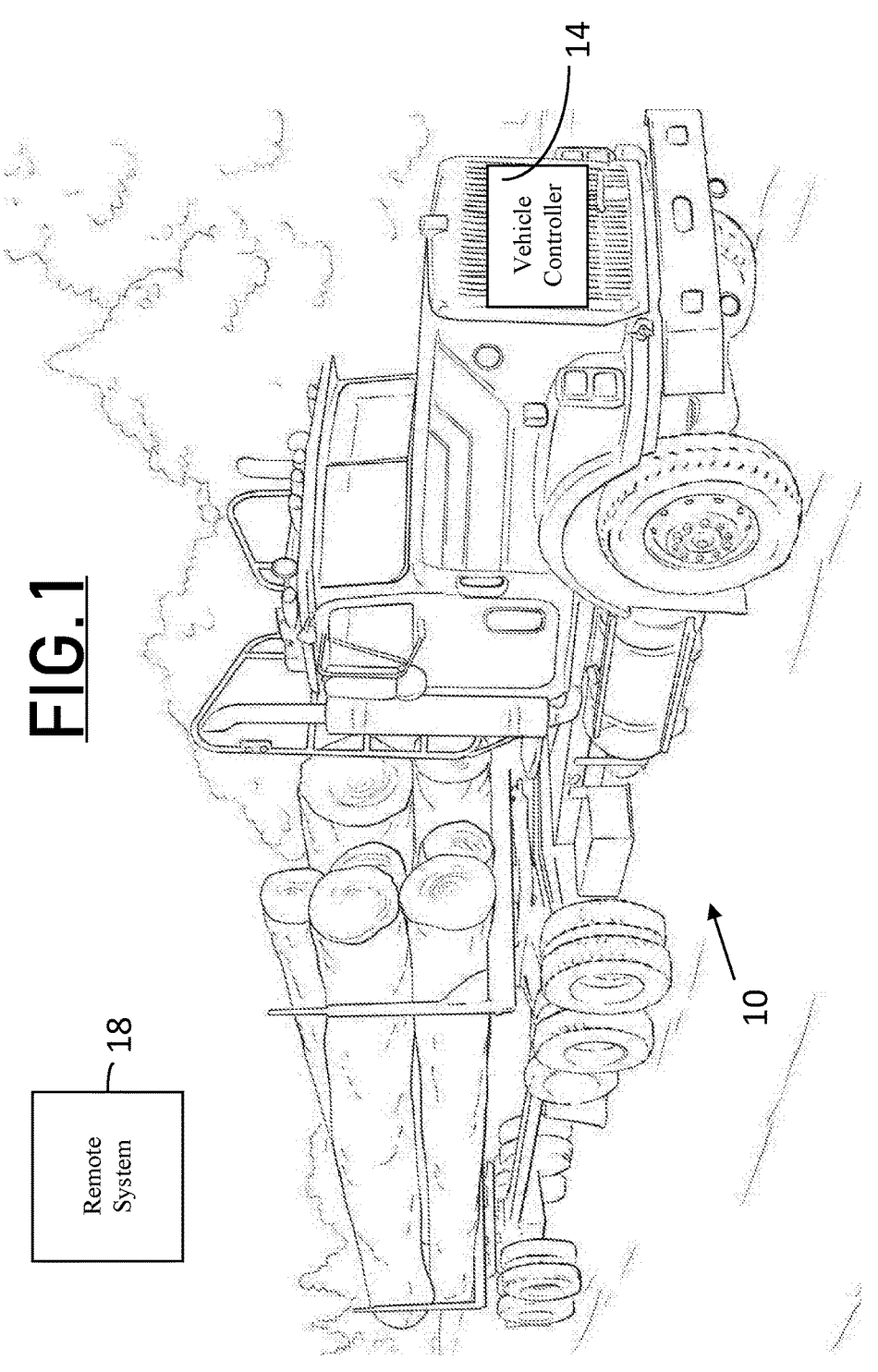
FIG. 1 is a perspective view of a vehicle in communication with a remote system according to some embodiments.

Following below are more detailed descriptions of various concepts related to, and implementations of, methods, apparatuses, and systems for a vehicle including a control system (e.g., an electronic control unit (ECU), such as an engine control unit) in communication with a remote system structured to provide diagnostic capabilities. Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Referring to the Figures generally, the various embodiments disclosed herein relate to systems, apparatuses, and methods for and operation thereof of a remote digital twin for a vehicle. The vehicle includes a vehicle controller in the form of an electronic control unit (e.g., an engine control unit) that receives sensor information from sensors positioned within the vehicle, processes the sensor information to determine actuator outputs, and controls the operation of the actuators (e.g., a fuel handling system, an air handling system, a transmission, a diesel exhaust fluid doser in a selective catalytic reduction (SCR) system, etc.) according to the actuator outputs. The vehicle controller further includes a telematics circuit that is structured to package or otherwise communicate the sensor information and the actuator outputs to a remote computer system via, for example, a telematics unit. The remote system includes a digital twin of the vehicle controller structured to process the sensor information and the actuator outputs in the same or similar manner as the vehicle controller. According to the present disclosure and in one embodiment, the digital twin controller allows every parameter utilized by a control scheme of the vehicle controller to be reproduced remotely. The reproduction of every control parameter allows for a more thorough diagnostic analysis of the operation of the vehicle controller. In other words, the remote system is not dependent on a shortened list of control parameters (e.g., a few hundred parameters) that are communicated from the vehicle controller. The vehicle controller instead communicates the sensor information (i.e., inputs to the control scheme) and actuator outputs to the remote system. The sensor information and actuator outputs include a significantly smaller amount of data or information (e.g., on the order of tens of pieces of information) as compared to the total list of control parameters used by the vehicle controller (e.g., on the order of tens of thousands of control parameters). The digital twin controller therefore allows for remote diagnostics to be performed with a complete set of control parameters, which reduces the amount of information that needs to be communicated between the vehicle and the remote system.

Typically, engine control modules or engine control units have on the order 10,000 to 20,000 parameters calculated on a frequency of 20 ms to 1 second. To save costs, engine control modules or units (and, similarly, other types of electronic control units, such as a transmission control unit) include minimal data storage and most parameters are only used for current or active calculations. To better understand controls behavior over a range of conditions, a data logger can be installed on select or a few individual vehicles. The use of data loggers can increase the amount of data storage and include cellular signal data transfer to remote data servers. However, data transfer may be limited to 400 to 500 parameters at a 1 second rate. The limited bandwidth available has pushed previous engineering teams to try to predict what subset of control parameters they will need for analysis or diagnostics. Since only less than about 5% of the total list of control parameters can be realistically communicated, many times not all of the needed information is available to the remote diagnostic system. Aspects of the systems disclosed herein can minimize the data transfer over cellular signal connection and dramatically increase the richness of the information. This can be done by transferring only the inputs, integrator states (for history), and outputs (to check results). The full set of parameters can then be calculated on the cloud (e.g., the remote system) using the full system controls simulation as a digital twin of the engine control module or unit.

Referring now to FIG. 1, a vehicle 10 is shown according to an example embodiment. The vehicle 10 is structured for on-highway travel. As described herein, the concepts described herein are applicable with vehicles, such as the vehicle 10. In other embodiments, the concepts discussed herein may be applied to an off-highway vehicle, a generator set, and other machinery (e.g., wheel loaders, dozers, generators, etc.).

The vehicle 10 includes a vehicle controller 14 structured to control, at least partly, operation of the vehicle 10 and to communicate with a remote system 18. In some embodiments, the vehicle controller 14 communicates with the remote system via a cellular connection or any other wireless technology. The remote system 18 is structured to receive information from the vehicle controller 14 and perform diagnostic, prognostic, and/or, in some embodiments, control operations.

Figure 2:
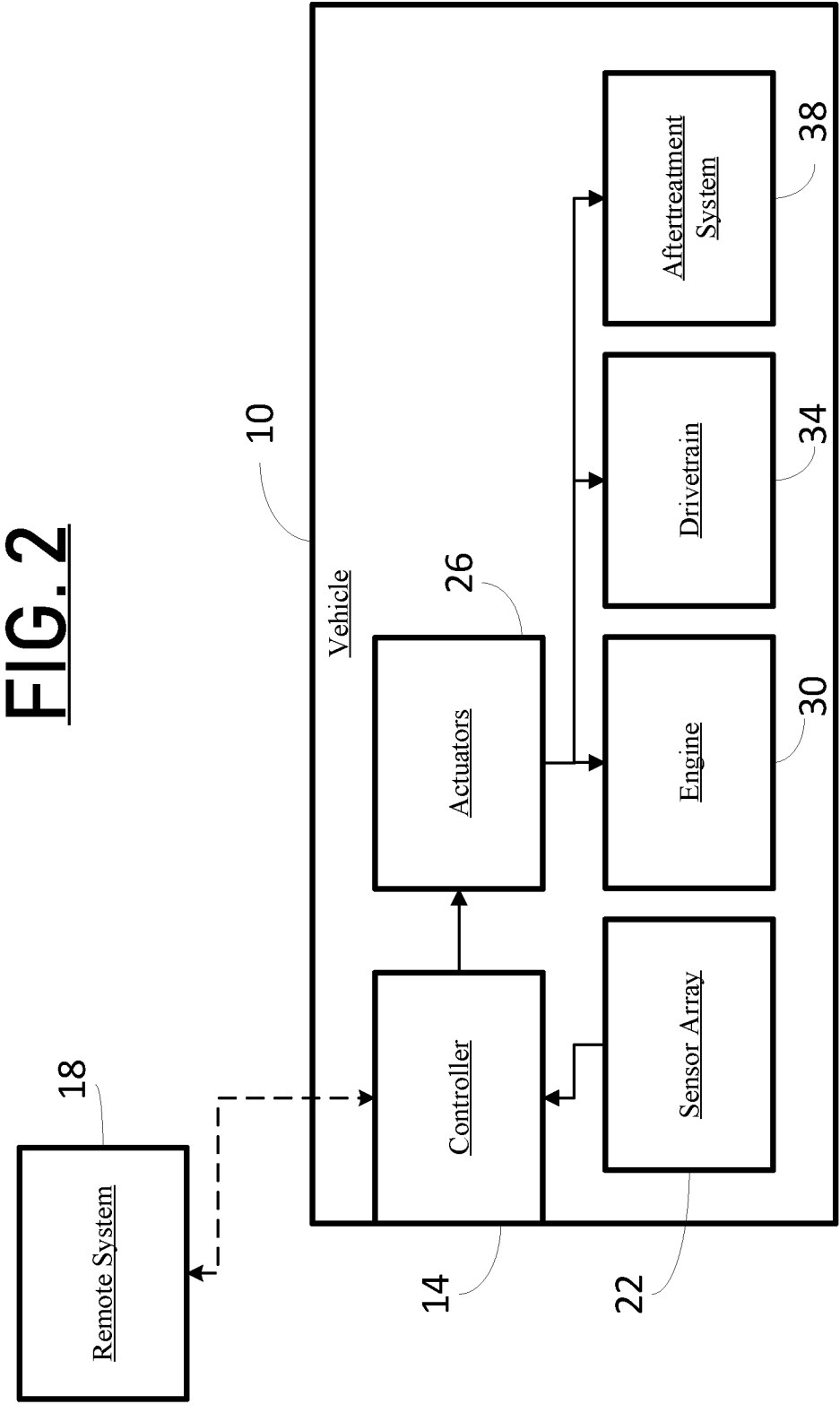
FIG. 2 is a schematic view of the vehicle in communication with the remote system of FIG. 1 according to some embodiments.

As shown in FIG. 2, the vehicle includes the vehicle controller 14, a sensor array 22 structured to provide signals to the vehicle controller 14 indicative of various operating parameters of the vehicle 10 (e.g., engine out temperature, NOx levels, vehicle speed, engine torque, suspension travel distance, etc.), actuators 26 (e.g., motors, pneumatics, servos, linear actuators, piezoelectric actuators, valves, regulators, etc.) arranged to control, at least aspects thereof, various vehicle systems (e.g., a fuel handling system, an air handling system, a transmission, a spark timing system, a braking system, a diesel exhaust fluid doser for a selective catalyst reduction aftertreatment system, etc.), an engine 30 or other prime mover structured to provide power to the vehicle 10, a drivetrain 34 coupled to the engine and structured to propel the vehicle 10 for over-ground movement, and an aftertreatment system 38 structured to treat exhaust gases produced by the engine 30 before release to the atmosphere. The vehicle controller 14 is structured for wireless communication with the remote system 18, in some embodiments. In some embodiments, the vehicle controller 14 could be structured for periodic wired communication with the remote system 18 (e.g., via an Ethernet cable or another type of wired connection).

The sensor array 22 can include physical sensors structured to directly measure operating parameters (e.g., O2 sensors, NOx sensors, temperature sensors, pressure sensors, strain gauges, etc.) and/or virtual sensors that determine operating parameters based on the information collected by other physical sensors and algorithms or models (e.g., a vehicle weight sensor based on information received from a strain gauge). Additionally, the sensor array 22 includes one or more user interfaces or controls (e.g., a steering wheel, an acceleration pedal, etc.) that provide signals indicative of a user input. In some embodiments, for example, the actuators 26 are in the form of a fuel valve in a fuel injection system, an air valve in an air handling system, and a DEF valve in a DEF dosing system. In some embodiments, the actuators 26 can include any device structured to physically or virtually control a vehicle system relevant to the vehicle controller 14 and are not limited to actuators related to the engine 30, drivetrain 34, and aftertreatment system 38. The vehicle 10 can include other actuators 26 and the vehicle controller 14 is configured to control the actuators 26 via control signals. The engine 30 may include a compression ignition engine (e., a diesel engine), a spark-ignition engine (e.g., a gasoline engine), or another type of prime mover (e.g., an electric or hybrid system). The drivetrain 34 and aftertreatment system 38 can be any systems structured to operate with the engine 30.

As the components of FIG. 1 are shown to be embodied in the vehicle 10, the vehicle controller 14 may be structured as one or more electronic control units (ECU). The vehicle controller 14 may be separate from or included with at least one of a transmission control unit, an exhaust aftertreatment control unit, a powertrain control module, an engine control module, etc. The function and structure of the vehicle controller 14 is described in greater detail in FIG. 3.

Figure 3:
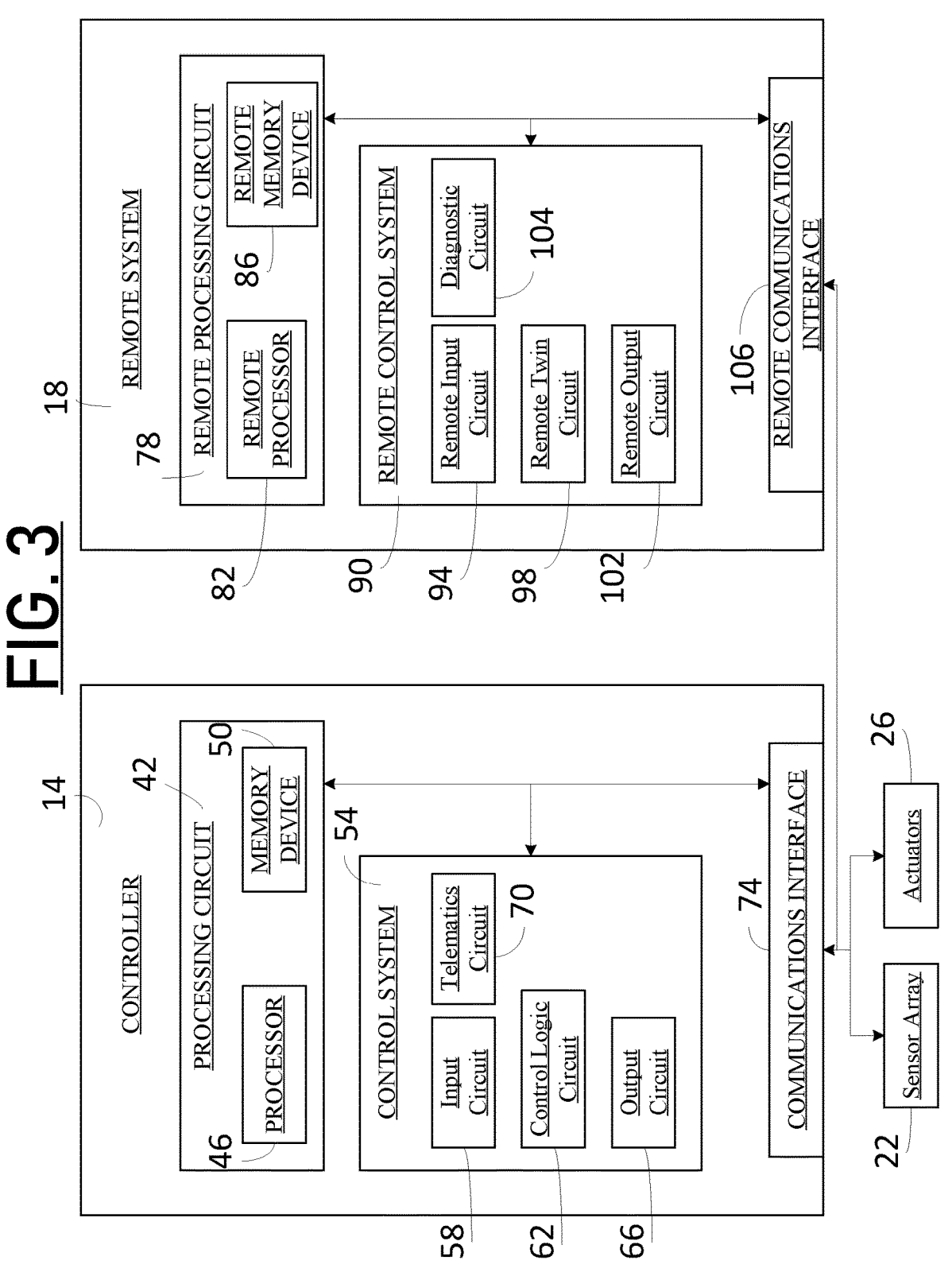
FIG. 3 is a schematic view of a controller of the vehicle of FIG. 1 according to some embodiments.

Referring now to FIG. 3, a schematic diagram of the vehicle controller 14 of the vehicle 10 of FIG. 1 is shown according to an example embodiment. As shown in FIG. 3, the vehicle controller 14 includes a processing circuit 42 having a processor 46 and a memory device 50, a control system 54 having an input circuit 58 structured to receive information from the sensor array 22, a control logic circuit 62 structured to receive information from the input circuit 58 and determine control parameters, an output circuit 66 structured to receive the control parameters and send instructions to the actuators 26, and a telematics circuit 70 structured to package the sensor information and the control parameters for communication with the remote system 18, and a communications interface 74. Generally, the vehicle controller 14 is structured to control operation, at least partly, of one or more vehicle systems. The vehicle controller 14 may also be structured to perform one or more diagnostics and/or prognostics on one or more vehicle systems or components. The input circuit 58 collects information from the sensor array 22 including any user interfaces or controls, and the control logic circuit 62 determines control parameters that are provided to the actuators 26 via the output circuit 66 to enact control of the vehicle 10.

In one configuration, the input circuit 58, the control logic circuit 62, the output circuit 66, and the telematics circuit 70 are embodied as machine or computer-readable media that is executable by a processor, such as processor 46. As described herein and amongst other uses, the machine-readable media facilitates performance of certain operations to enable reception and transmission of data. For example, the machine-readable media may provide an instruction (e.g., command, etc.) to, e.g., acquire data. In this regard, the machine-readable media may include programmable logic that defines the frequency of acquisition of the data (or, transmission of the data). The computer readable media may include code, which may be written in any programming language including, but not limited to, Java or the like and any conventional procedural programming languages, such as the "C" programming language or similar programming languages. The computer readable program code may be executed on one processor or multiple remote processors. In the latter scenario, the remote processors may be connected to each other through any type of network (e.g., CAN bus, etc.).

In another configuration, the input circuit 58, the control logic circuit 62, the output circuit 66, and the telematics circuit 70 are embodied as hardware units, such as electronic control units. As such, the input circuit 58, the control logic circuit 62, the output circuit 66, and the telematics circuit 70 may be embodied as one or more circuitry components including, but not limited to, processing circuitry, network interfaces, peripheral devices, input devices, output devices, sensors, etc. In some embodiments, the input circuit 58, the control logic circuit 62, the output circuit 66, and the telematics circuit 70 may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the input circuit 58, the control logic circuit 62, the output circuit 66, and the telematics circuit 70 may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on). The input circuit 58, the control logic circuit 62, the output circuit 66, and the telematics circuit 70 may also include programmable hardware devices such as field programmable gate arrays, programmable array logic, programmable logic devices or the like. The input circuit 58, the control logic circuit 62, the output circuit 66, and the telematics circuit 70 may include one or more memory devices for storing instructions that are executable by the processor(s) of the input circuit 58, the control logic circuit 62, the output circuit 66, and the telematics circuit 70. The one or more memory devices and processor(s) may have the same definition as provided below with respect to the memory device 50 and processor 46. In some hardware unit configurations, the input circuit 58, the control logic circuit 62, the output circuit 66, and the telematics circuit 70 may be geographically dispersed throughout separate locations in the vehicle. Alternatively and as shown, the input circuit 58, the control logic circuit 62, the output circuit 66, and the telematics circuit 70 may be embodied in or within a single unit/housing, which is shown as the vehicle controller 14.

In the example shown, the vehicle controller 14 includes the processing circuit 42 having the processor 46 and the memory device 50. The processing circuit 42 may be structured or configured to execute or implement the instructions, commands, and/or control processes described herein with respect to input circuit 58, the control logic circuit 62, the output circuit 66, and the telematics circuit 70. Thus, the depicted configuration represents the input circuit 58, the control logic circuit 62, the output circuit 66, and the telematics circuit 70 as machine or computer-readable media. However, as mentioned above, this illustration is not meant to be limiting as the present disclosure contemplates other embodiments where the input circuit 58, the control logic circuit 62, the output circuit 66, and the telematics circuit 70, or at least one circuit of the input circuit 58, the control logic circuit 62, the output circuit 66, and the telematics circuit 70, is configured as a hardware unit. All such combinations and variations are intended to fall within the scope of the present disclosure.

The processor 46 may be implemented as a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, or state machine. The processor 46 also may be implemented as a combination of computing devices, such as a combination of a DSP and a microprocessor, a plurality of microprocessors, one or more microprocessors in conjunction with a DSP core, or any other such configuration. In some embodiments, the one or more processors may be shared by multiple circuits (e.g., the input circuit 58, the control logic circuit 62, the output circuit 66, and the telematics circuit 70) may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure.

The memory device 50 (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory device 50 may be communicably connected to the processor 46 to provide computer code or instructions to the processor 46 for executing at least some of the processes described herein. Moreover, the memory device 50 may be or include tangible, non-transient volatile memory or non-volatile memory. Accordingly, the memory device 50 may include database components, object code components, script components, or any other type of information structure for supporting the various activities and information structures described herein.

The input circuit 58 is structured to receive sensor information from the sensor array 22 via the communication interface 74. The input circuit 58 may modify or format the sensor information (e.g., via an analog/digital converter) so that the sensor information can be readily used by the control logic circuit 62. In one embodiment, the sensor information may be re quest for a speed adjustment from a cruise control system.

The control logic circuit 62 is structured to receive the sensor information from the input circuit 58 and determine control parameters based on the sensor information. As used herein, "control parameters" refer to values or information determined within the control logic circuit 62 by the embedded control logic, model, algorithm, or other control scheme. The "control parameters" are intermediate values or information relative to the inputs and outputs. In this regard, the control parameters may include values or information that represents a status or a state of a vehicle system, a predictive state information, or any other values or information, or intermediate values or information used by the control logic circuit 62 to determine what the controller 14 should do or what the outputs should be. In some embodiments, the control logic circuit 62 generates tens of thousands of control parameters during operation. The "control parameters" are used to generate and determine an output that is transmitted to one or more actuators for controlling a vehicle system.

For modern internal combustion engines (e.g., the engine 30), a complex control scheme is needed to balance requirements to provide power at the best possible fuel economy, while ensuring emissions are controlled. The engine 30 is operated to meet durability expectations, and the vehicle controller 14 can diagnose various issues in performance or emissions. Operation and control are carried out over a large variety of duty cycles, ambient conditions, and part to part variation. In order to control the technology needed to meet these requirements, "control parameters" are used to understand the current state of the components and how to adjust the actuators. On a typical modern diesel engine, there are on the order of thirty sensors and fifteen actuators. Thus, the engine 30 may include a variety of sensors and actuators. This includes items like: air handling components, including variable geometry turbochargers, EGR valves, throttles, variable valve actuators, etc.; combustion, including multiple fuel injection events varying in quantity and timing, fuel pressure, etc.; and aftertreatment, including catalyst bed temperatures, stored constituents (like ammonia or particulates), progress towards filling or regeneration of the catalyst, special cleaning events, etc. It is also advantageous to be able to diagnose the engine 30 for service and confirm that none of the sensors, actuators, or components are performing poorly and leading to increased emissions.

In some embodiments, the control logic circuit 62 includes algorithms or traditional control logic (e.g., PIDs, etc.). In some embodiments, the control logic circuit 62 includes modelling architecture for component integration or other model based logic (e.g., physical modelling systems that utilize lookup tables). In some embodiments, the control logic circuit 62 utilizes one or more lookup tables stored on the memory device 50 for determination of the control parameters. In some embodiments, the control logic circuit 62 may include artificial intelligence or machine learning circuits, or fuzzy logic circuits, as desired. In one embodiment, the control logic circuit 62 may receive the request for the speed adjustment, and determine a control parameter in the form of a fuel flow rate.

The output circuit 66 is structured to receive the control parameters from the control logic circuit 62 and provide outputs in the form of actuation information (i.e., the "output") to the actuators 26 based on the control parameters via the communications interface 74. In one embodiment, the output circuit 66 receives the fuel flow rate from the control logic circuit 66 and outputs a pulse-width-modulated signal to a fuel injector to achieve the fuel flow rate.

The telematics circuit 70 is structured to receive the sensor information from the input circuit 58 and the actuation information from the output circuit 66. In some embodiments, the telematics circuit 7 receives the sensor information and the actuation information directly from the input circuit 58 and the output circuit 66. In some embodiments, the input information and the actuation information is stored in the memory device 50 and the telematics circuit retrieves the sensor information and the actuation information from the memory device 50. The telematics circuit 70 is also structured to format the sensor information and actuation information into data packets that can be efficiently sent to the remote system 18 via a wireless communication system. In some embodiments, the data packets are structured for transmission over a cellular network or a modem. In some embodiments, a different communication network/structure may be used (e.g., Bluetooth®, WiFi, satellite communication, Vehicle-to-X (e.g., where "X" is infrastructure, another vehicle, etc.). The telematics circuit 70 is structured to connect and communicate with the remote system 18. In some embodiments, the telematics circuit 70 communicates with the remote system 18 via the communications interface 74. In some embodiments, the telematics circuit 70 is a separate controller system structured to receive the sensor information and the actuation information and communicate with external systems (e.g., the remote system 18) independent of the communications interface 74.

The remote system 18 may be a cloud computing component. The remote system 18 may include one or more servers. The remote system 18 is structured to communicate with one or more vehicle controllers 14. The function and structure of the remote system 18 is described in greater detail in FIG. 3.

Referring now to FIG. 3, a schematic diagram of the remote system 18 of the vehicle 10 of FIG. 1 is shown according to an example embodiment. As shown in FIG. 3, the remote system 18 includes a remote processing circuit 78 having a remote processor 82 and a remote memory device 86, a remote control system 90 having a remote input circuit 94 structured to receive the sensor information from the telematics circuit 70 of the vehicle controller 14, a remote twin circuit 98 structured to virtually recreate the control logic of the control logic circuit 62 of the vehicle controller 14, a remote output circuit 102 structured to receive the actuation information from the telematics circuit 70 of the vehicle controller 14 and compare the actuation information to virtual output information determined by the remote twin circuit 98, and a diagnostic circuit 104 structured to analyze the sensor information, actuation information, and control parameters, and a communications interface 106. Generally, the remote system 18 is structured to receive the data packets from the telematics circuit 70 of the vehicle controller 14, unpack the data packets, recreate the control logic of the control logic circuit 62 within the remote twin circuit 98, and utilize the parameters created within the remote twin circuit 98 for diagnostic analysis.

In one configuration, the remote input circuit 94, the remote twin circuit 98, the remote output circuit 102, and the diagnostic circuit 104 are embodied as machine or computer-readable media that is executable by a processor, such as remote processor 82. As described herein and amongst other uses, the machine-readable media facilitates performance of certain operations to enable reception and transmission of data. For example, the machine-readable media may provide an instruction (e.g., command, etc.) to, e.g., acquire data. In this regard, the machine-readable media may include programmable logic that defines the frequency of acquisition of the data (or, transmission of the data). The computer readable media may include code, which may be written in any programming language including, but not limited to, Java or the like and any conventional procedural programming languages, such as the "C" programming language or similar programming languages. The computer readable program code may be executed on one processor or multiple remote processors. In the latter scenario, the remote processors may be connected to each other through any type of network (e.g., CAN bus, etc.).

In another configuration, the remote input circuit 94, the remote twin circuit 98, the remote output circuit 102, and the diagnostic circuit 104 are embodied as hardware units, such as electronic control units. As such, the remote input circuit 94, the remote twin circuit 98, the remote output circuit 102, and the diagnostic circuit 104 may be embodied as one or more circuitry components including, but not limited to, processing circuitry, network interfaces, peripheral devices, input devices, output devices, sensors, etc. In some embodiments, the remote input circuit 94, the remote twin circuit 98, the remote output circuit 102, and the diagnostic circuit 104 may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the remote input circuit 94, the remote twin circuit 98, the remote output circuit 102, and the diagnostic circuit 104 may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on). The remote input circuit 94, the remote twin circuit 98, the remote output circuit 102, and the diagnostic circuit 104 may also include programmable hardware devices such as field programmable gate arrays, programmable array logic, programmable logic devices or the like. The remote input circuit 94, the remote twin circuit 98, the remote output circuit 102, and the diagnostic circuit 104 may include one or more memory devices for storing instructions that are executable by the processor(s) of the remote input circuit 94, the remote twin circuit 98, the remote output circuit 102, and the diagnostic circuit 104. The one or more memory devices and processor(s) may have the same definition as provided below with respect to the remote memory device 86 and remote processor 82. In some hardware unit configurations, the remote input circuit 94, the remote twin circuit 98, the remote output circuit 102, and the diagnostic circuit 104 may be geographically dispersed throughout separate locations in the vehicle. Alternatively and as shown, the remote input circuit 94, the remote twin circuit 98, the remote output circuit 102, and the diagnostic circuit 104 may be embodied in or within a single unit/ housing, which is shown as the remote system 18.

In the example shown, the remote system 18 includes the remote processing circuit 78 having the remote processor 82 and the remote memory device 86. The remote processing circuit 78 may be structured or configured to execute or implement the instructions, commands, and/or control processes described herein with respect to remote input circuit 94, the remote twin circuit 98, the remote output circuit 102, and the diagnostic circuit 104. The depicted configuration represents the remote input circuit 94, the remote twin circuit 98, the remote output circuit 102, and the diagnostic circuit 104 as machine or computer-readable media. However, as mentioned above, this illustration is not meant to be limiting as the present disclosure contemplates other embodiments where the remote input circuit 94, the remote twin circuit 98, the remote output circuit 102, and the diagnostic circuit 104, or at least one circuit of the remote input circuit 94, the remote twin circuit 98, the remote output circuit 102, and the diagnostic circuit 104, is configured as a hardware unit. All such combinations and variations are intended to fall within the scope of the present disclosure.

The hardware and data processing components used to implement the various processes, operations, illustrative logics, logical blocks, modules and circuits described in connection with the embodiments disclosed herein (e.g., the remote processor 82) may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, or state machine. A processor also may be implemented as a combination of computing devices, such as a combination of a DSP and a microprocessor, a plurality of microprocessors, one or more microprocessors in conjunction with a DSP core, or any other such configuration. In some embodiments, the one or more processors may be shared by multiple circuits (e.g., the remote input circuit 94, the remote twin circuit 98, the remote output circuit 102, and the diagnostic circuit 104 may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure.

The remote memory device 86 (e.g., memory, memory unit, storage device) may include one or more devices (e.g., RAM, ROM, Flash memory, hard disk storage) for storing data and/or computer code for completing or facilitating the various processes, layers and modules described in the present disclosure. The remote memory device 86 may be communicably connected to the remote processor 82 to provide computer code or instructions to the remote processor 82 for executing at least some of the processes described herein. Moreover, the remote memory device 86 may be or include tangible, non-transient volatile memory or non-volatile memory. Accordingly, the remote memory device 86 may include database components, object code components, script components, or any other type of information structure for supporting the various activities and information structures described herein.

The remote input circuit 94 is structured to receive the data packets from the telematics circuit 70 of the vehicle controller 14 and unpack or retrieve the sensor information. In some embodiments, the sensor information is received directly from the telematics circuit 70 without the use of data packets or other formatting or compression. Similar to the input circuit 58, the remote input circuit 94 may modify or format the sensor information (e.g., via an analog/digital converter) so that the sensor information can be readily used by the remote twin circuit 98 to produce results (e.g., control parameters) substantially identical to those produced by the control logic circuit 62 of the vehicle controller 14.

The remote twin circuit 98 (e.g., a remote twin ECU) is structured similarly to the control logic circuit 62 so that the remote twin circuit 98 is able to reproduce identical control parameters when compared with the control logic circuit 62 given the same sensor information. The remote twin circuit 98 is structured to receive the sensor information from the remote input circuit 94 and determine control parameters based on the sensor information. In some embodiments, the remote twin circuit 98 includes algorithms or traditional control logic (e.g., PIDs, etc.). In some embodiments, the remote twin circuit 98 includes modelling architecture for component integration or other model based logic (e.g., physical modelling systems that utilize lookup tables). In some embodiments, the remote twin circuit 98 utilizes one or more lookup tables stored on the remote memory device 86 for determination of the control parameters. In some embodiments, the remote twin circuit 98 may include artificial intelligence or machine learning circuits, or fuzzy logic circuits, as desired. In some embodiments, the remote twin circuit 98 is a virtual circuit in the form of executable software.

Similar to the output circuit 66, the remote output circuit 102 is structured to receive the control parameters from the remote twin circuit 98 and determine actuation information based on the control parameters.

The diagnostic circuit 104 is structured to analyze the sensor information, the control parameters, and the actuation information to diagnose problems or operational actions of the vehicle controller 14. As discussed above, the control logic circuit 62 of the vehicle controller 14 produces tens of thousands of control parameters during operation and that number of data points is not feasible to communicate over a wireless network. The remote twin circuit 98 is structured to reproduce those tens of thousands of control parameters in the remote system 18 where the control parameters, along with the sensor information, and the actuation information can be analyzed for diagnostic purposes. Access to the full suite of control parameters allows engineers to understand operational modes of the vehicle 10 far better than has previously been possible with access to only the few hundred preselected control parameters.

Figure 4:
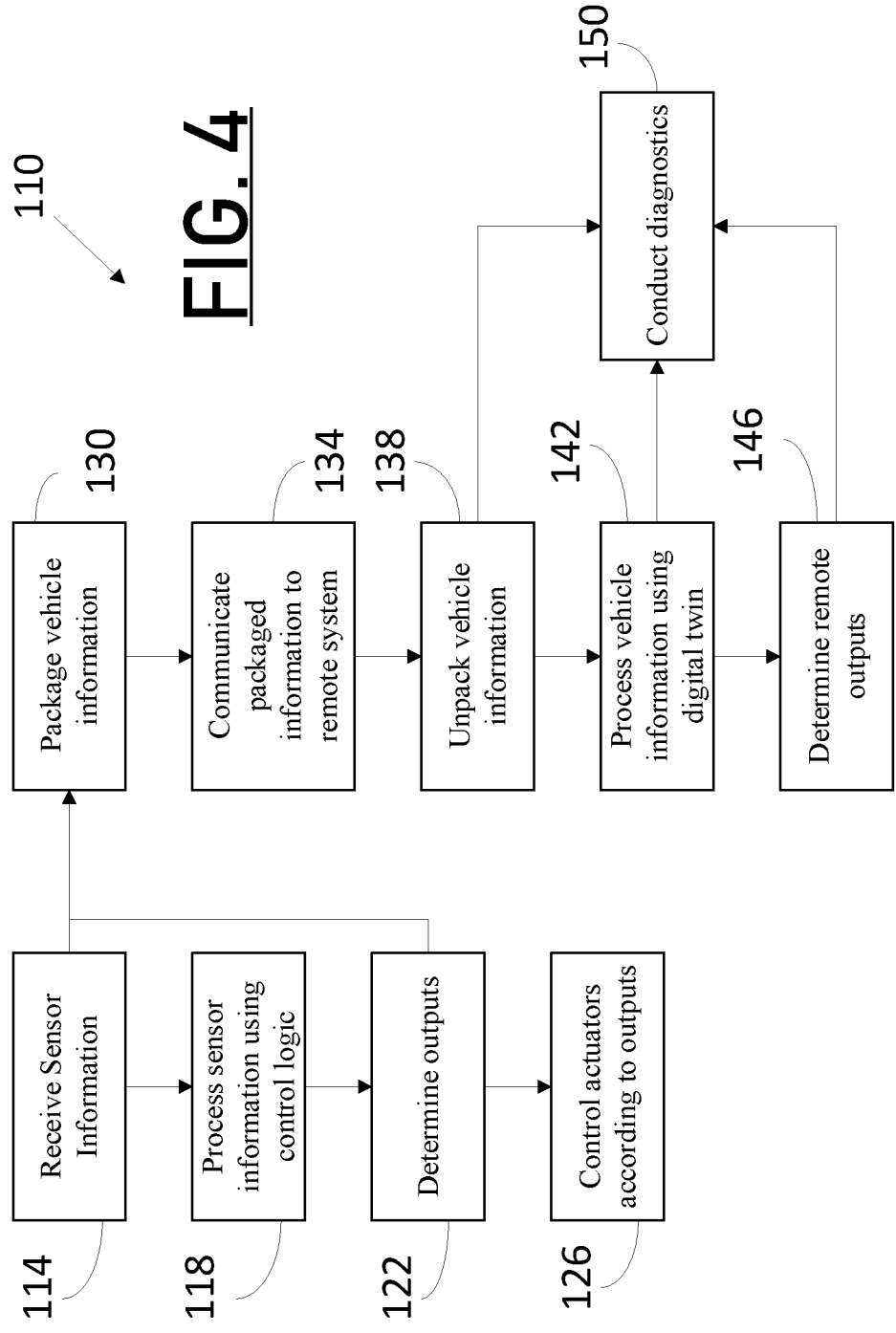
FIG. 4 is a flow diagram of a method of operation of the vehicle of FIG. 1 according to some embodiments.

As shown in FIG. 4, a method 110 of operating the vehicle controller 14 and the remote system 18 includes receiving sensor information at the input circuit 58 at step 114. The input circuit 58 provides the sensor information to the control logic circuit 62 and at step 118, the control logic 62 circuit determine control parameters and outputs are determined at step 122. At step 126, the output circuit 66 determine the actuation information and controls the actuation of the actuators 26.

At step 130, the telematics circuit 70 packages the sensor information and actuation information into data packets and the data packets are communicated to the remote system 18 at step 134. At step 138, the remote system 18 unpacks the data packets so that the remote input circuit 94 receives the sensor information and the diagnostic circuit 104 receives the actuation information. The remote twin circuit 98 determines control parameters and outputs at step 142 responsive to the received sensor information. At step 146, remote actuation information is determined by the remote output circuit 102.

At step 150, the diagnostic circuit 104 receives the sensor information, the control parameters, the actuation information, and the remote actuation information and conducts diagnostic activities. In some embodiments, diagnostic activities include determining the cause of failures, faults, or abnormal actions of the vehicle 10. The ability to access all the control parameters, and not merely a predetermined subset, provides a greater opportunity to accurately determine a root cause of any problem or abnormality.

The remote system 18 and the remote twin circuit 98 more specifically allow for an exact duplication of the control logic circuit 62 so that all operational states, control parameters, and calculations/determinations can be extracted for diagnostic purposes. The remote twin circuit 98 can be called a digital twin of the control logic circuit 62 and can be used in conjunction with a modelling architecture for component integration to gain in depth understanding of how a system (e.g., the engine 30, an aftertreatment system doser, etc.) is functioning.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using one or more separate intervening members, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic. For example, circuit A communicably "coupled" to circuit B may signify that the circuit A communicates directly with circuit B (i.e., no intermediary) or communicates indirectly with circuit B (e.g., through one or more intermediaries).

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

While various circuits with particular functionality are shown in FIG. 3, it should be understood that the vehicle controller 14 and or the remote system 18 may include any number of circuits for completing the functions described herein. For example, the activities and functionalities of the input circuit 58, the control logic circuit 62, the output circuit 66, and the telematics circuit 70 may be combined in multiple circuits or as a single circuit. Additional circuits with additional functionality may also be included. Further, the vehicle controller 14 may further control other activity beyond the scope of the present disclosure.

As mentioned above and in one configuration, the "circuits" may be implemented in machine-readable medium for execution by various types of processors, such as the processor 46 of FIG. 3. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

While the term "processor" is briefly defined above, the term "processor" and "processing circuit" are meant to be broadly interpreted. In this regard and as mentioned above, the "processor" may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the vehicle controller and the remote system as shown in the various exemplary embodiments is illustrative only. Additionally, any element disclosed in one embodiment may be incorporated or utilized with any other embodiment disclosed herein. For example, the output circuit 66 of the exemplary embodiment may be incorporated in the control logic circuit 62 of the exemplary embodiment. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A system comprising:

a vehicle system actuator of a vehicle;

a sensor array associated with the vehicle system actuator;

a vehicle controller comprising one or more memory devices coupled to one or more processors, the one or more memory devices configured to store instructions thereon that, when executed by the one or more processors, cause the one or more processors to:

receive, from the sensor array, sensor information including a user input to control at least one operation of the vehicle system actuator;

determine local control parameters comprising a first plurality of intermediate values relative to the sensor information and local actuator outputs to control the at least one operation of the vehicle system actuator in accordance with a control scheme;

generate the local actuator outputs in a form of local actuation instructions configured to control the at least one operation of the vehicle system actuator based on the first plurality of intermediate values of the local control parameters;

provide, to the vehicle system actuator, the local actuation instructions to control the at least one operation of the vehicle system actuator; and transmit only the sensor information and the local actuator outputs via a telematics device; and a remote processing circuit located remotely from the vehicle, the remote processing circuit comprising one or more memory devices coupled to one or more processors, the one or more memory devices configured to store instructions thereon that, when executed by the one or more processors, cause the one or more processors to:

receive, from the telematics device, only the sensor information including the user input to control the vehicle system actuator and the local actuator outputs;

determine remote control parameters based on the sensor information in accordance with the control scheme used by the vehicle controller, the remote control parameters comprising a second plurality of intermediate values for remote actuator outputs to replicate the local control parameters for controlling the at least one operation of the vehicle system actuator;

generate the remote actuator outputs in a form of remote actuation instructions configured to replicate controlling of the at least one operation of the vehicle system actuator based on the second plurality of intermediate values of the remote control parameters; and determine, based on a comparison of the remote actuator outputs and the local actuator outputs, a fault in the at least one operation of the vehicle system actuator.

2. The system of claim 1, wherein transmitting the sensor information includes assembling the sensor information into compressed data packets that are transmitted over a cellular network.

3. The system of claim 1, wherein the vehicle system actuator is associated with an engine, a transmission, or an aftertreatment system.

4. The system of claim 1, wherein the remote processing circuit is structured to determine the remote control parameters independent of the vehicle controller.

5. The system of claim 1, wherein the remote processing circuit is structured to implement predictive maintenance based on diagnostics.

6. The system of claim 5, wherein the remote processing circuit is structured to recreate a fault condition of the vehicle controller with the diagnostics.

7. The system of claim 1, wherein the vehicle controller is an engine control unit of the vehicle.

8. The system of claim 1, wherein the local actuation instructions comprises a local control signal to cause the vehicle system actuator to perform the at least one operation specified by the local control signal, and wherein the remote actuation instructions comprises a remote control signal to replicate controlling of the at least one operation of the vehicle system actuator.

9. The system of claim 1, wherein the one or more processors of the vehicle controller is further configured to determine, as a function of the sensor information, the first plurality of intermediate values comprising at least one of a current state of the vehicle system actuator or predictive state information for the vehicle system actuator.

10. The system of claim 1, wherein the one or more processors of the vehicle controller is further configured to transmit data comprising only the sensor information and the local actuator outputs, without the first plurality of intermediate values of the local control parameters.

11. A processing circuit comprising:

one or more memory devices coupled to one or more processors, the one or more memory devices configured to store instructions thereon that, when executed by the one or more processors, cause the one or more processors to:

receive, from a sensor array mounted in a vehicle, sensor information including a user input to control the vehicle;

determine local control parameters comprising a first plurality of intermediate values relative to the sensor information and local actuator outputs to control at least one operation of a vehicle system actuator in accordance with a control scheme of the vehicle;

generate the local actuator outputs in a form of local actuation instructions configured to control the at least one operation of the vehicle system actuator based on the first plurality of intermediate values of the local control parameters;

provide, to the vehicle system actuator, the local actuation information to control the at least one operation of the vehicle system actuator;

transmit only the sensor information and the local actuator outputs via a telematics device to a digital twin processing circuit located remote from the vehicle to cause the digital twin processing circuit to:

determine remote control parameters comprising a second plurality of intermediate values in accordance with the control scheme used by the vehicle to replicate the local control parameters for controlling the at least one operation of the vehicle system actuator, generate remote actuator outputs in a form of remote actuation instructions configured to replicate controlling of the at least one operation of the vehicle system actuator based on the second plurality of intermediate values of the remote control parameters; and determine a fault in the vehicle system actuator based on a comparison of the remote actuator outputs and the local actuator outputs;

receive, via the telematics device, the remote actuator outputs determined by the digital twin processing circuit; and update the local control parameters using the remote actuator outputs.

12. The processing circuit of claim 11, wherein transmitting the sensor information includes assembling the sensor information into compressed data packets that are transmitted over a cellular network.

13. The processing circuit of claim 11, wherein the processing circuit is an engine control unit of the vehicle.

14. A processing circuit located remotely from a vehicle and comprising:

one or more memory devices coupled to one or more processors, the one or more memory devices configured to store instructions thereon that, when executed by the one or more processors, cause the one or more processors to:

receive, from a telematics device associated with a vehicle controller, only sensor information including a user input to control at least one operation of a vehicle system actuator and local actuator outputs in a form of local actuation information configured to control the at least one operation of the vehicle system actuator;

determine remote control parameters based on the sensor information in accordance with a control scheme of the vehicle controller, the remote control parameters comprising a first plurality of intermediate values for remote actuator outputs to replicate local control parameters comprising a second plurality of intermediate values generated by the vehicle controller to control the vehicle system actuator;

generate the remote actuator outputs in a form of remote actuation information configured to replicate controlling of the at least one operation of the vehicle system actuator based on the second plurality of intermediate values of the remote control parameters; and determine, based on comparison of the remote actuator outputs and the local actuator outputs, a fault in the at least one operation of the vehicle system actuator.

15. The processing circuit of claim 14, wherein the remote control parameters are identical to the local control parameters.

16. The processing circuit of claim 14, wherein the one or more processors are structured to determine the remote control parameters independently.

17. The processing circuit of claim 14, wherein receiving the sensor information includes receiving compressed data packets over a cellular network, and unpacking the compressed data packets.

18. The processing circuit of claim 14, wherein the one or more processors are structured to transmit the remote control parameters to the telematics device of the vehicle controller.

* * * * *